US012542399B2

(12) United States Patent
Scherer et al.

(10) Patent No.: US 12,542,399 B2
(45) Date of Patent: Feb. 3, 2026

(54) ELECTRICAL PLUG CONNECTOR

(71) Applicant: KOSTAL Kontakt Systeme GmbH, Luedenscheid (DE)

(72) Inventors: Thomas Scherer, Luedenscheid (DE); Josef Fruehauf, Horovice (CZ); Thomas Drescher, Hueckeswagen (DE)

(73) Assignee: KOSTAL Kontakt Systeme Gmbh & Co. KG, Luedenscheid (DE)

(*) Notice: Subject to any disclaimer, the term of this patent is extended or adjusted under 35 U.S.C. 154(b) by 346 days.

(21) Appl. No.: 18/349,225

(22) Filed: Jul. 10, 2023

(65) Prior Publication Data

US 2023/0352879 A1 Nov. 2, 2023

Related U.S. Application Data

(63) Continuation of application No. PCT/EP2022/051220, filed on Jan. 20, 2022.

(30) Foreign Application Priority Data

Jan. 23, 2021 (DE) ..................... 10 2021 000 345.4
Oct. 6, 2021 (DE) ..................... 10 2021 005 000.2

(51) Int. Cl.
*H01R 13/62* (2006.01)
*H01R 13/629* (2006.01)
*H01R 13/641* (2006.01)

(52) U.S. Cl.
CPC ... *H01R 13/62955* (2013.01); *H01R 13/6295* (2013.01); *H01R 13/641* (2013.01)

(58) Field of Classification Search
None
See application file for complete search history.

(56) References Cited

U.S. PATENT DOCUMENTS 6,319,050 B1 * 11/2001 Miyazaki ......... H01R 13/62938 439/157
9,583,860 B1 2/2017 DeWitte
(Continued)

FOREIGN PATENT DOCUMENTS

CN 111755881 A 10/2020
DE 10143266 A1 4/2003
(Continued)

OTHER PUBLICATIONS

European Patent Office, International Search Report for the International Application No. PCT/EP2022/051220, dated May 13, 2022.

(Continued)

*Primary Examiner* — Ross N Gushi
(74) *Attorney, Agent, or Firm* — Brooks Kushman P.C.

(57) ABSTRACT

An electrical plug connector includes a plug connector housing and a connecting lever. The connecting lever is rotatable with respect to the plug connector housing between an initial position and an end position. The connecting lever includes a locking element having a first part fixed to the connecting lever and a second part displaceable relative to the first part. The locking element mechanically locks the connecting lever in the end position to the plug connector housing when the connecting lever is in the end position and the second part is displaced relative to the first part to a locking position. The first and second parts of the locking element respectively carry first and second sections of an optical code. The optical code is completed when the second part is displaced relative to the first part to the locking position whereby the optical code is detectable by an optical reading device.

15 Claims, 18 Drawing Sheets

(56) References Cited

U.S. PATENT DOCUMENTS

| | | | | |
|---|---|---|---|---|
| 9,748,693 | B1 | 8/2017 | Exenberger et al. | |
| 9,748,695 | B2 | 8/2017 | Gibeau | |
| 10,651,586 | B2 * | 5/2020 | Christiano | H01R 13/436 |
| 11,296,462 | B2 * | 4/2022 | Schneider | H01R 13/465 |
| 2019/0372262 | A1 | 12/2019 | Christiano et al. | |
| 2021/0111519 | A1 | 4/2021 | Schneider et al. | |

FOREIGN PATENT DOCUMENTS

| | | | |
|---|---|---|---|
| DE | 202016008846 | U1 | 1/2020 |
| EP | 3206264 | A1 | 8/2017 |

OTHER PUBLICATIONS

German Patent and Trademark Office, German Search Report for German Patent Application No. 10 2021 005 000.2 dated Dec. 16, 2021.

The International Bureau of WIPO, International Preliminary Report on Patentability for International Application No. PCT/EP2022/051220 issued Jul. 20, 2023.

* cited by examiner

A - A

ELECTRICAL PLUG CONNECTOR

CROSS-REFERENCE TO RELATED APPLICATIONS

This application is a continuation of International Application No. PCT/EP2022/051220, published in German, with an international filing date of Jan. 20, 2022, which claims priority to DE 10 2021 000 345.4, filed Jan. 23, 2021, and DE 10 2021 005 000.2, filed Oct. 6, 2021, the disclosures of which are incorporated in their entirety by reference herein.

TECHNICAL FIELD

The present invention relates to an electrical plug connector having a plug connector housing and a connecting lever, the connecting lever having two mutually connected, parallel lever parts arranged on the plug connector housing, the connecting lever parts being rotatable and/or displaceable with respect to the plug connector housing between an initial position of the connecting lever and an end position of the connecting lever, the connecting lever parts each having a guide path into which respective guide pins, integrally formed on an attachable mating plug connector housing, are inserted in the initial position of the connecting lever, and the guide pins by rotation and/or displacement of the connecting lever are displaced along the guide path, the connecting lever further having a locking element that is displaceable relative to the plug connector housing, the locking element when being in a displacement position referred to as the locking position mechanically locks the connecting lever, in its end position, to the plug connector housing, and the locking element carrying an optical code that is fully detectable and decodable by an optical reading device precisely when the locking element is in the locking position.

BACKGROUND

The correct mechanical and electrical connection of electrical plug connectors is relevant to security in many applications. Therefore, after the connection, it is often provided to secure electrical plug connectors against inadvertent separation of the connection, using a locking element.

In order to determine and document that a locking element at a plug connector arrangement has reached its correct locking position, it is known to detect optical encoding, coupled to the locking element, by use of an optical reading device.

This type of electrical plug connector is disclosed in German Utility Model DE 20 2016 008 846 U1 (corresponds to U.S. Pat. No. 9,583,860). The plug connector arrangement described in this document has a display feature (i.e., an indicator), carried by a housing, with a visual marking (i.e., visual identifier) situated thereon, and a cover feature (i.e., a concealment feature) that is carried by the housing. The display feature and the cover feature are movable relative to one another between a concealed position and an exposed position. The cover feature conceals (or obscures) at least a portion of the visual marking in the concealed position. The visual marking in the exposed position is at least either exposed or exposable. The display feature is in the concealed position relative to the cover feature when the housing is not completely connected to the mating plug. The display feature is in the exposed position relative to the cover feature when the housing is completely connected to the mating plug.

A visual marking is thus recognizable here when a display feature and a cover feature are in a certain configuration relative to one another, while in other configurations the visual marking is at least partially concealed.

Such an interaction of a display feature with a visual marking and a cover feature is not advantageous or easy to achieve for every type of electrical plug connector.

SUMMARY

An object is to provide a generic electrical plug connector in a simple and cost-effective manner, in which an optical encoding can be monitored in an alternative way.

In embodiments of the present invention, an electrical plug connector includes a plug connector housing and a connecting lever. The connecting lever is arranged on the plug connector housing and can be rotated and/or displaced with respect to the plug connector housing between an initial position and an end position. The connecting lever has a locking element. The locking element is displaceable in relation to the plug connector housing. In the end position of the connecting lever, the locking element mechanically locks the connecting lever to the plug connector housing when the locking element is in a displacement position referred to as a locking position. The locking element bears an optical code which can be fully detected and decoded by an optical reading device precisely when the locking element is in the locking position.

The locking element consists of a first locking element part and a second locking element part. The first and second locking element parts are displaceable in relation to each other with one of the locking element parts being fixed to the connecting lever by latching means. The first locking element part bears a first section or portion of the optical code. The second locking element part bears a second section or portion of the optical code. The optical code is completed when the locking element parts are in the locking position.

Embodiments of the present invention achieve the above object and/or other objects in that the locking element is made up of two locking element parts which are displaceable relative to one another, one of the locking element parts is fixed to the connecting lever by detent means, the locking element parts carry respective sections of the optical code, and the optical code is completed when the locking element parts are in the locking position.

It is thus provided that two parts of a locking element that are displaceable with respect to one another each carry a section of an optical code. Due to the joining together of the two optical code sections, the optical code is situated in an interruption-free manner and is thus detectable by an automatic reading device.

BRIEF DESCRIPTION OF THE DRAWINGS

Advantageous embodiments and refinements of an electrical plug connector in accordance with the present invention are illustrated and explained in greater detail below with reference to the drawings, which include the following.

DETAILED DESCRIPTION

Figure 1:
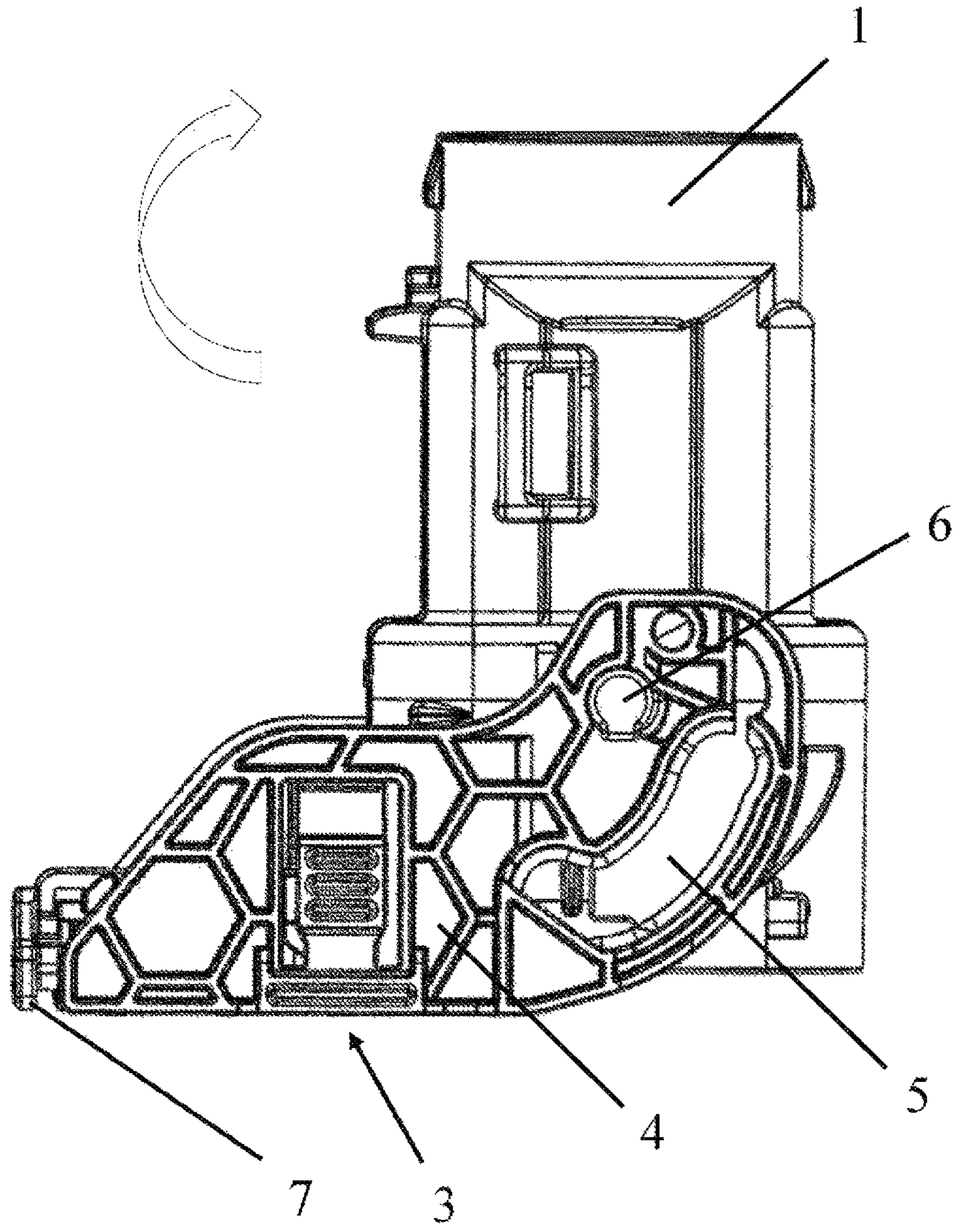
FIG. 1 illustrates a connecting lever of an electrical plug connector being in an initial position with respect to a plug connector housing of the electrical plug connector.

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIGS. 1, 2, 3, 4, 5, and 6, an electrical plug connector in accordance with embodiments of the present invention is shown. The electrical plug connector includes a plug connector housing 1 and a connecting lever 3. Connecting lever 3 is arranged on plug connector housing 1 and can be rotated and/or displaced with respect to the plug connector housing. Connecting lever 3 has a locking element 7. Locking element 7 is displaceable in relation to plug connector housing 1. Locking element 7 mechanically locks connecting lever 3 to plug connector housing 1 when the locking element is in a displacement position referred to as a locking position. Locking element 7 bears an optical code 9 which can be fully detected and decoded precisely by an optical reading device (not shown) when the locking element is in the locking position.

In further detail, FIGS. 1, 2, 3, 4, 5, and 6 each show plug connector housing 1 with connecting lever 3. Connecting lever 3 is made up of two lateral (e.g., parallel) lever parts 4. Connecting lever parts 4 are connected to one another via a connecting bar 2. At two lateral surfaces of plug connector housing 1, connecting lever parts 4 are respectively supported so as to be rotatable about a pivot pin 6. Connecting lever parts 4 are rotatable about pivot pin 6 with respect to plug connector housing 1 between an initial position, shown in FIGS. 1 and 4, and an end position, shown in FIGS. 2, 3, 5, and 6.

Figure 2:
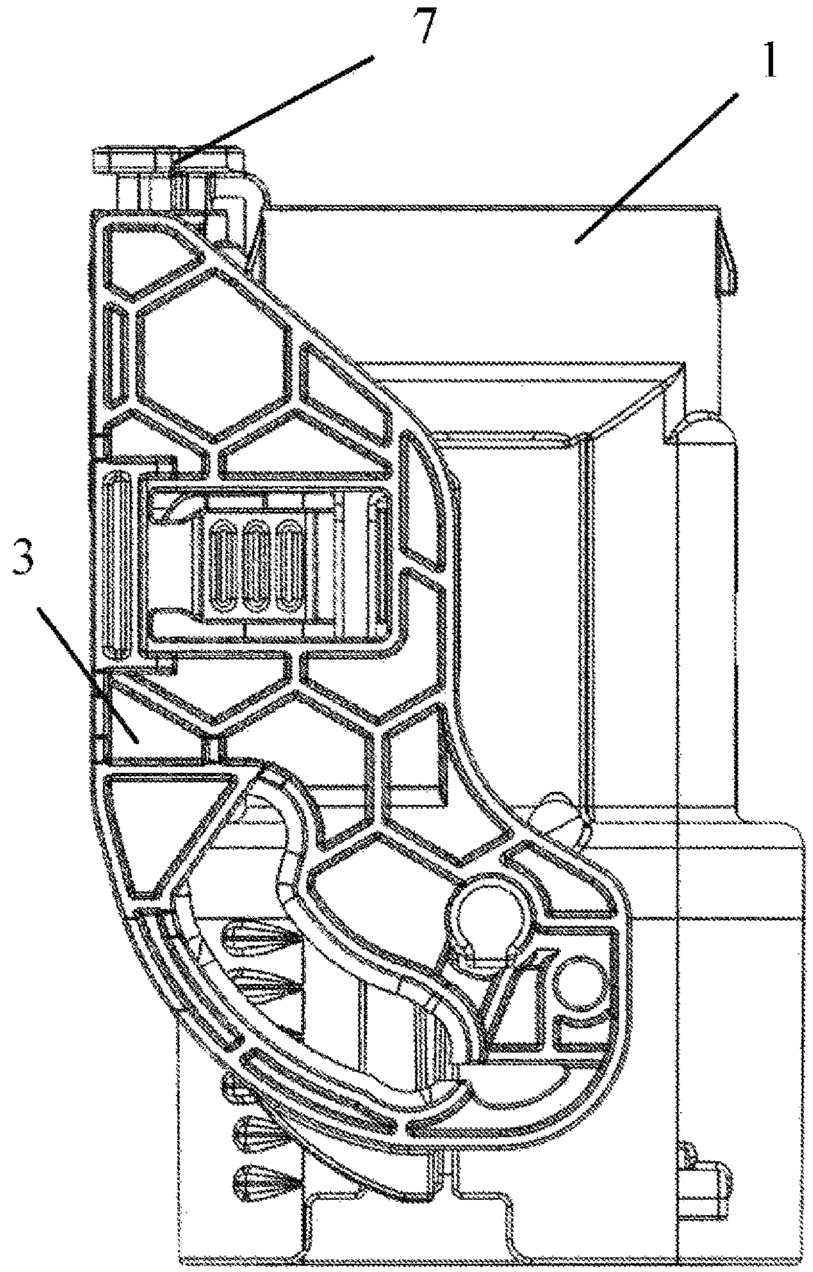
FIG. 2 illustrates the connecting lever being in an end position with respect to the plug connector housing.
Figure 3:
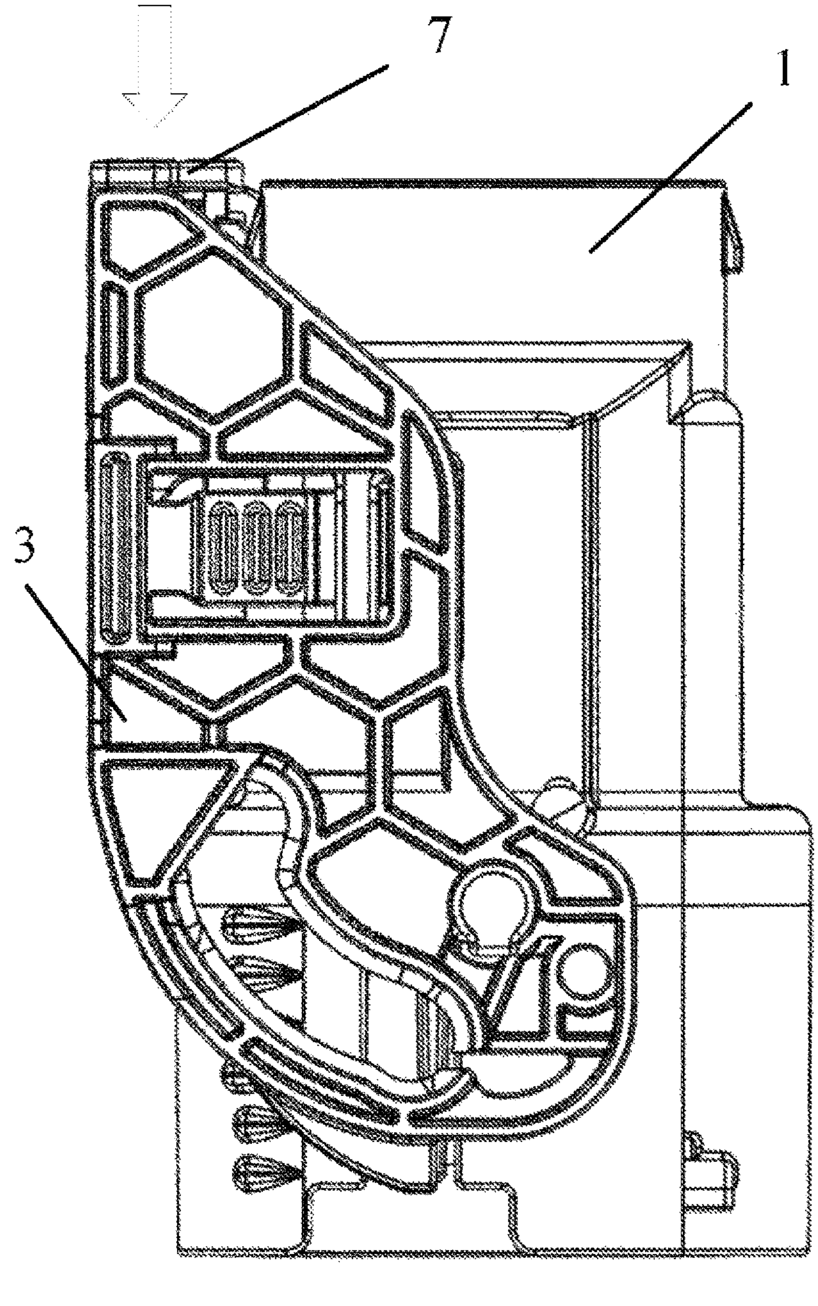
FIG. 3 illustrates the connecting lever being in the end position with a locking element of the connecting lever being set in a locking position.

A first one of connecting lever parts 4 is illustrated in each of FIGS. 1, 2, and 3. Connecting lever parts 4 each have an integrally formed, curved guide path 5. A pair of guide pins of a mating plug connector housing (not shown) are insertable in guide paths 5. The guide pins of the mating plug connector housing may be inserted into guide paths 5 while connecting lever 3 is in the initial position. The guide pins are displaced along guide paths 5, and thereby the mating plug connector housing is displaced relative to plug connector housing 1, as connecting lever 3 rotates between the initial position and the end position.

As such, when connecting lever 3 rotates from the initial position to the end position, plug connector housing 1 and the mating plug connector housing are mechanically brought close to one another, and the electrical contact elements situated in the housings are electrically connected to one another.

The connection of a plug connector housing to a mating plug connector housing by means of a rotary lever is not depicted in detail here, as this operation may be assumed to be known. This connection is illustrated and described, for example, with reference to FIG. 3 of the above-mentioned DE 20 2016 008 846 U1.

Figure 4:
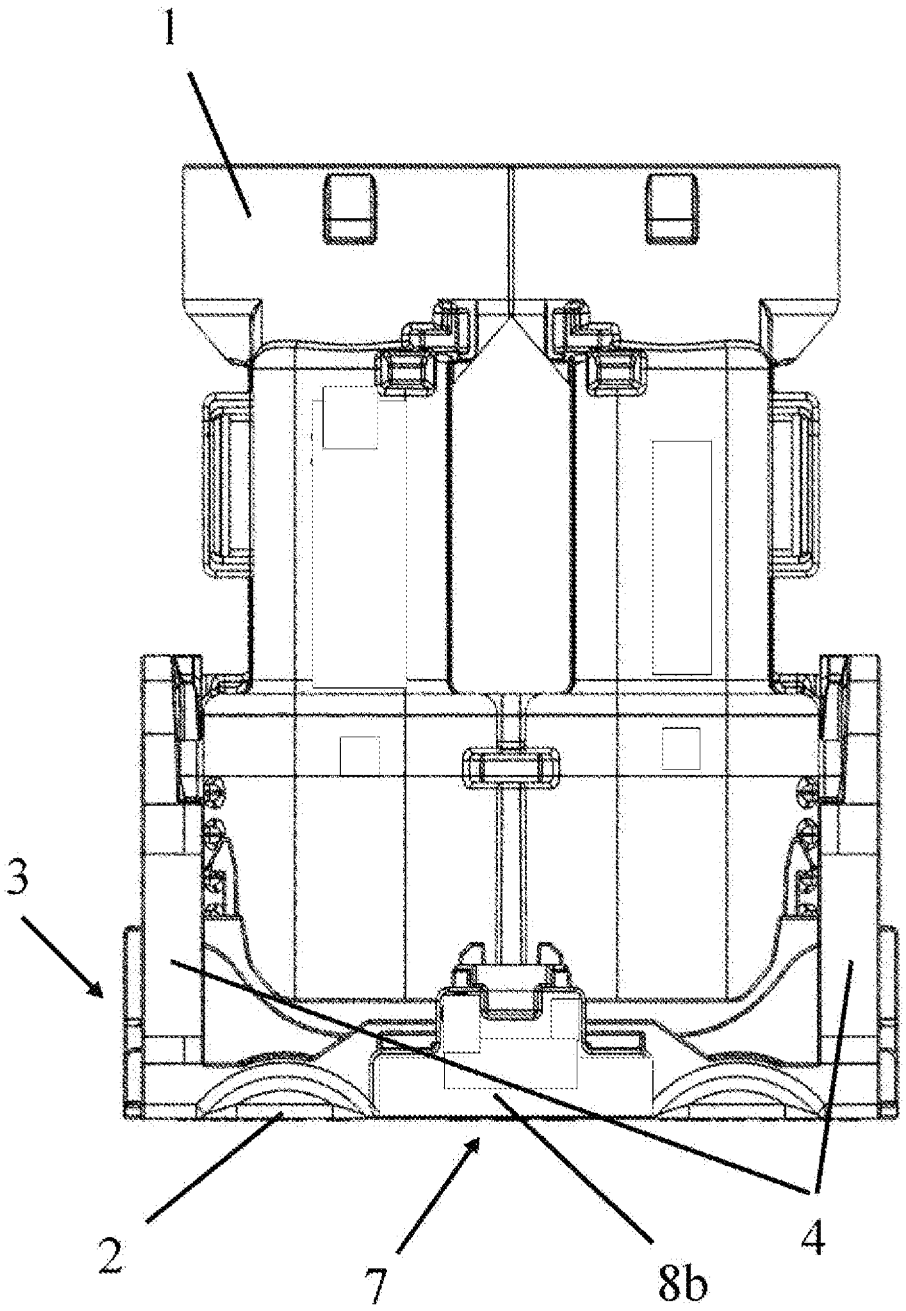
FIG. 4 illustrates a view according to FIG. 1 from another perspective.
Figure 5:
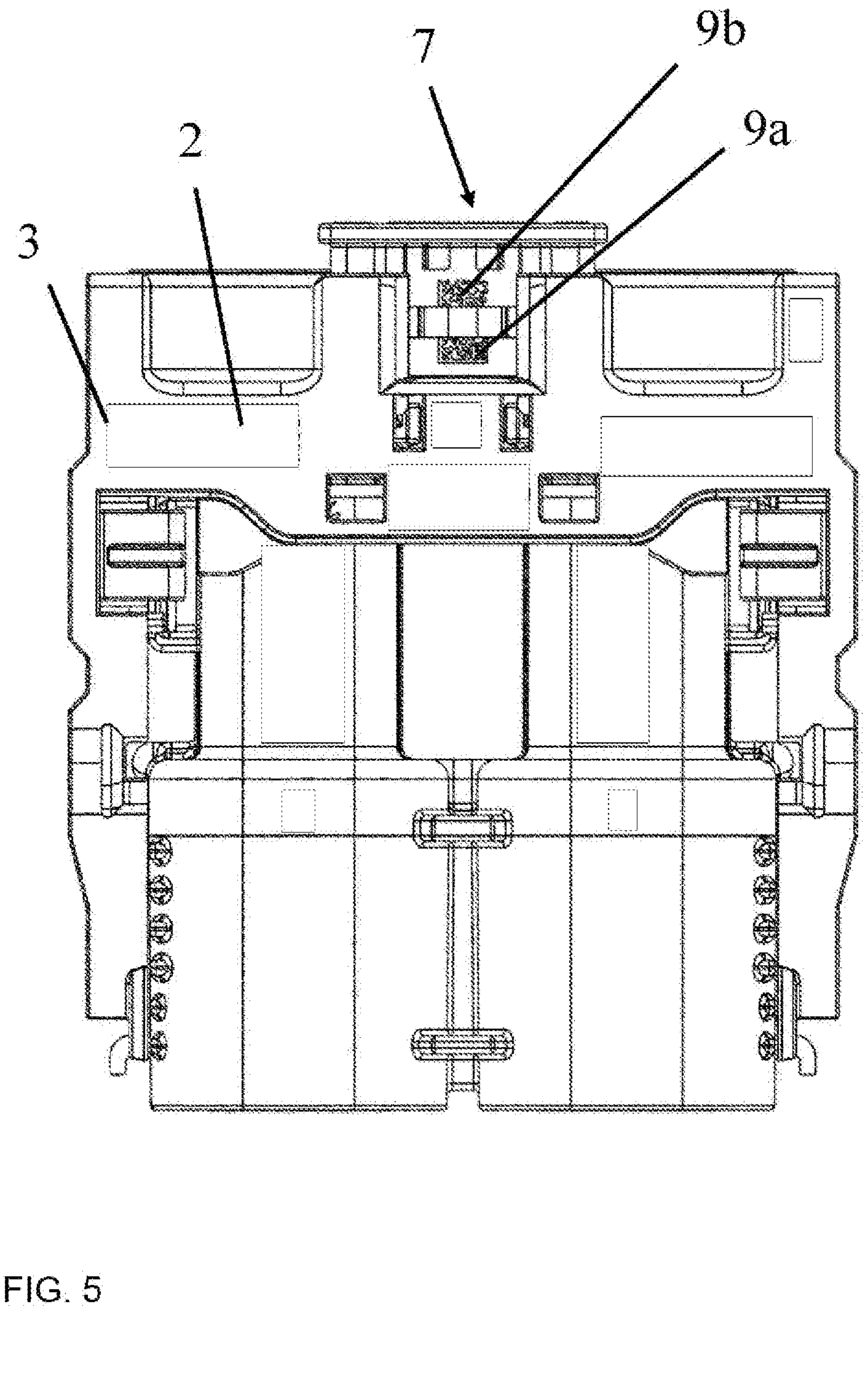
FIG. 5 illustrates a view according to FIG. 2 from another perspective.
Figure 6:
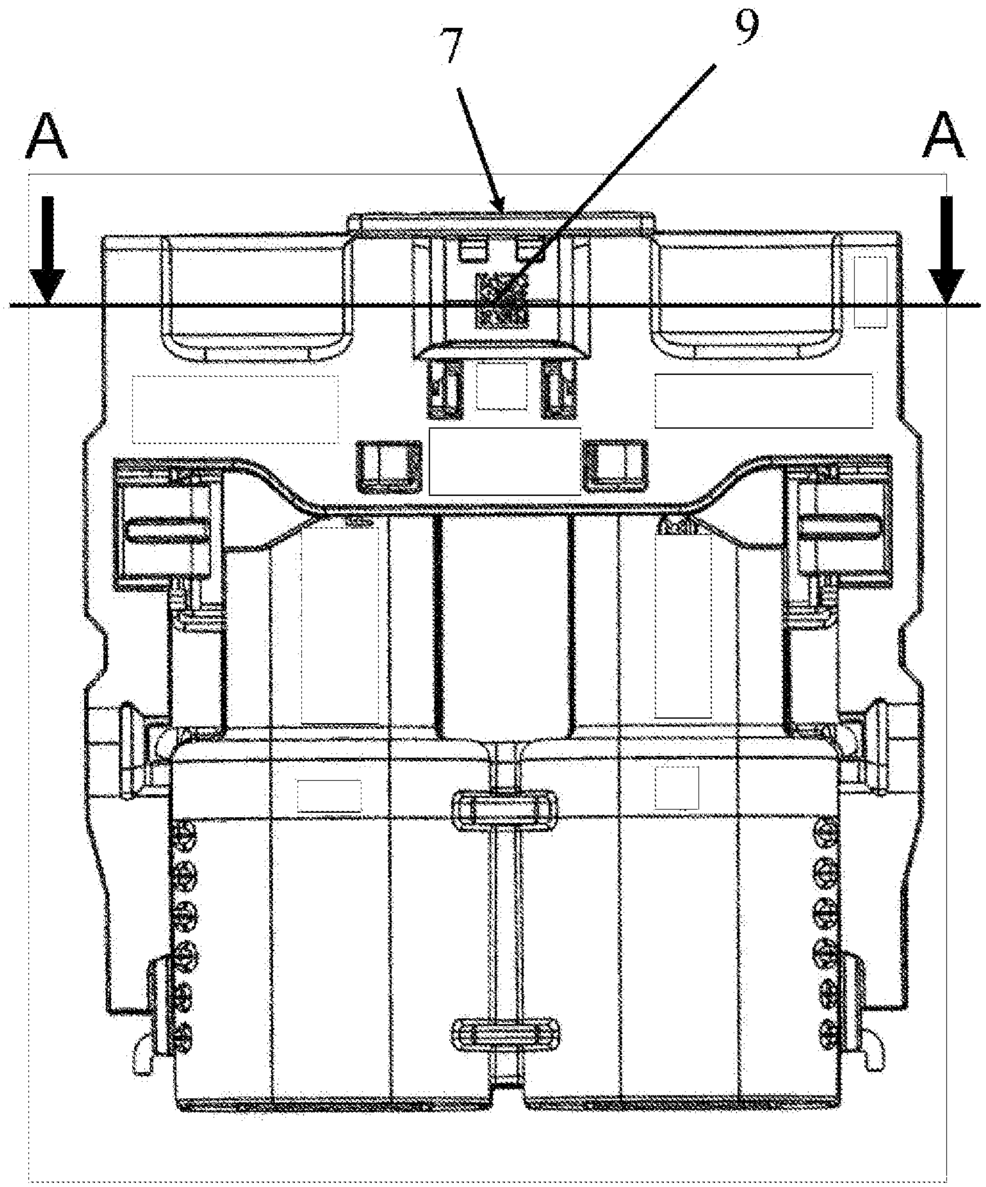
FIG. 6 illustrates a view according to FIG. 3 from another perspective.

FIGS. 4, 5, and 6 show corresponding views of plug connector housing 1 that is rotated by 90°, in which both connecting lever parts 4 and connecting bar 2 between the connecting lever parts are discernible in each case.

In the initial position of connecting lever 3, shown in FIGS. 1 and 4, guide pins of a mating plug connector housing may be inserted into guide paths 5 of connecting lever parts 4.

After connecting lever 3 is swiveled or pivoted into the end position, shown in FIGS. 2 and 5, plug connector housing 1 and the mating plug connector housing are already completely connected to one another. However, connecting lever 3 here is not yet secured to plug connector housing 1.

The securing of connecting lever 3 to plug connector housing 1 takes place by means of locking element 7 displaceably situated (e.g., slidably arranged) on connecting lever 3.

FIGS. 3 and 6 each show plug connector housing 1, as already shown in FIGS. 2 and 5, respectively, likewise with connecting lever 3 in its end position. In addition, locking element 7, by being pressed into connecting bar 2, has been brought into a position in which the locking element locks connecting lever 3 to plug connector housing 1. This position of locking element 7 is referred to as the locking position. Locking element 7 thus fulfills the known function of a housing securing lock or connector position assurance (CPA) lock.

It is essential that locking element 7 has an optical code 9, on the basis of which an optical reading device may recognize the correct position of locking element 7 at connecting lever 3, in particular without the need for means that conceal or expose the optical code.

To achieve this, locking element 7 is made up of two parts 8*a*, 8*b*. Locking element parts 8*a*, 8*b* are displaceable with respect to one another. Locking element parts 8*a*, 8*b* respectively carry only a section 9*a*, 9*b* of optical code 9. That is, optical code 9 is comprised of optical code sections 9*a*, 9*b*; first locking element part 8*a* carries optical code section 9*a*; and second locking element part 9*b* carries optical code section 9*b*. In a displacement position of locking element parts 8*a*, 8*b* relative to one another when locking element 7 is in the locking position, the two optical code sections 9*a*, 9*b* are situated in an interruption-free manner. As shown in FIG. 6, locking element 7 is in the locking position and has the interruption-free optical code 9.

Optical code 9 may in particular be a geometric symbol, a one-dimensional barcode, or, as shown in FIG. 6, a two-dimensional data matrix code. This type of optical code 9 may be automatically detected by an optical reading device.

In the present case, a geometric symbol is understood to mean a preferably simply structured graphical symbol that may be designed, for example, as a letter-like character or also as a geometric figure such as a circle, triangle, or rectangle.

A complete symbol is typically made up of one or more lines or surfaces. In the case of multiple lines or surfaces, they do not necessarily have to be connected to one another, and instead may be in a designated geometric configuration with respect to one another, for example in parallel or in alignment or in an interruption-free arrangement. An example of such a symbol is an equal sign, which is made up of a parallel arrangement of two parallel straight lines.

In particular, it may also be provided that multiple lines and/or surfaces must maintain certain distances from one another in order to form a complete symbol. The presence of these properties may be checked by the optical reading device, for example, in that the optical reading device compares the detected symbol to a representation of the symbol stored beforehand.

If locking element 7 is not in the locking position with connecting lever 3 shifted to the end position, as shown in FIG. 5, then optical code 9 is divided into two separate optical code sections 9*a*, 9*b*, which the optical reading device does not recognize as being valid.

When connecting lever 3 is not shifted to the end position or is not completely shifted to the end position, such as shown in FIGS. 1 and 4, for example, none of optical code 9 (i.e., neither of optical code sections 9*a*, 9*b*) appears in the area that is detectable by the optical reading device.

Locking element 7 together with optical code 9 is described in greater detail below with reference to FIGS. 7, 8, 9, 10, 11, and 12.

Figure 7:
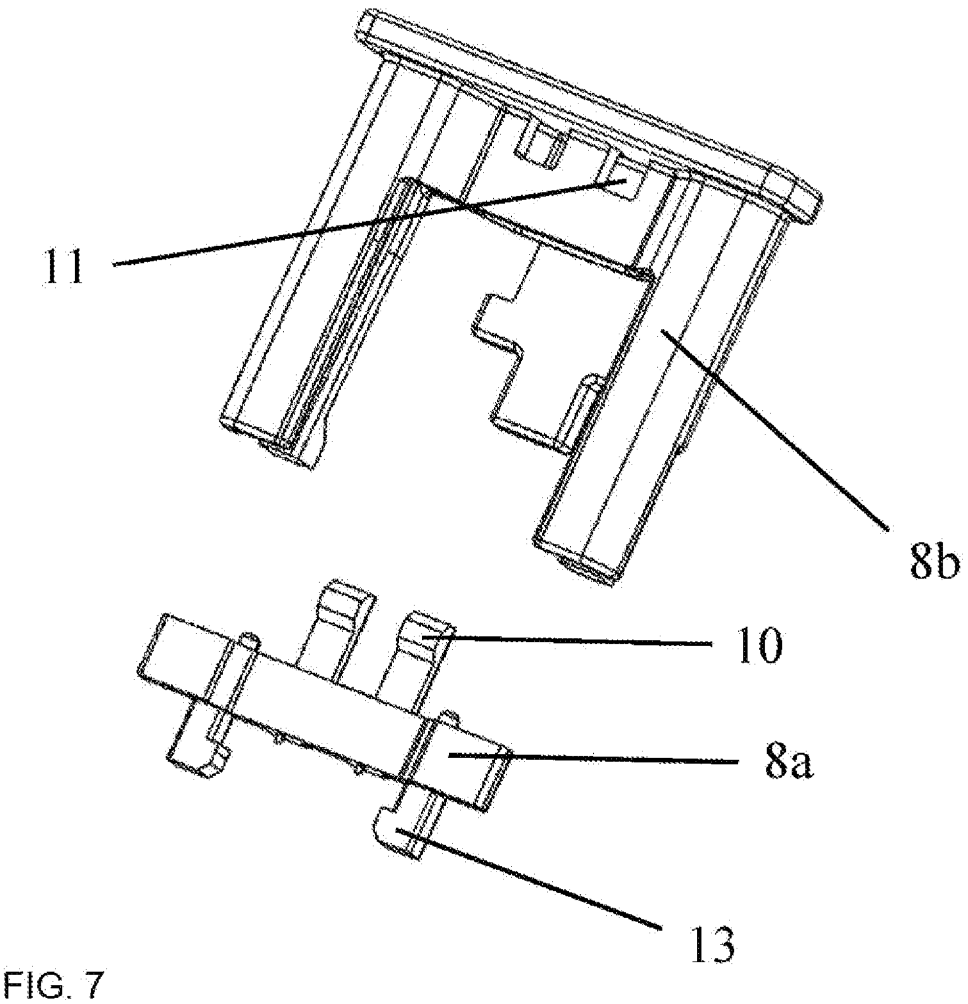
FIG. 7 illustrates first and second individual parts of the locking element, the first and second locking element parts being separated from one another.

As shown in FIG. 7, locking element 7 is made up of two individual locking element parts 8*a*, 8*b*. First locking element part 8*a* has the shape of a bar, having two spring hooks 10 integrally formed on one longitudinal side of the bar, and having two latching hooks 13 integrally formed on the other longitudinal side of the bar.

Second locking element part 8*b* has two mutually parallel guides 15 that are connected to one another via a crossbar 12 and that each have a molded-in guide groove 16. First locking element part 8*a* may be displaceably inserted into the two guide grooves 16. Crossbar 12 has two recesses 11 between guides 15.

Figure 8:
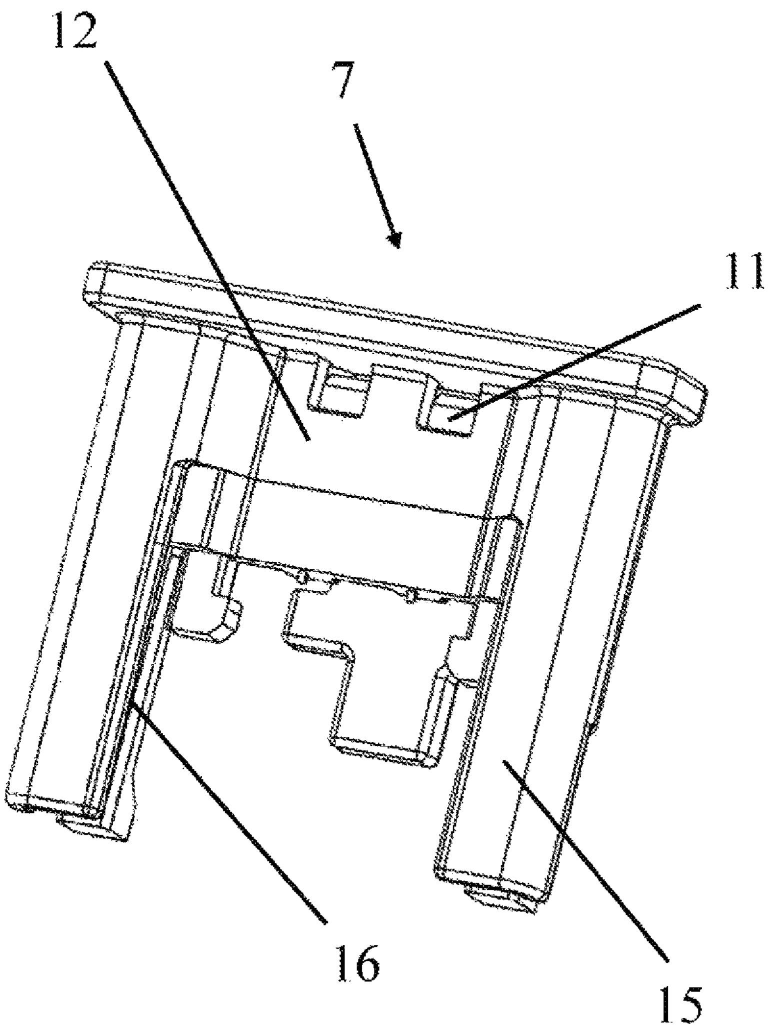
FIG. 8 illustrates the first and second locking element parts being interconnected.

According to the assembly state of locking element 7 illustrated in FIG. 8, the edge sections of first locking element part 8*a* are inserted into guides 15 of second locking element part 8*b*. First locking element part 8*a* is then pushed toward second locking element part 8*b* until the first locking element part stops at crossbar 12 of the second locking element part. As a result, the end sections of spring hook 10 are snapped into recesses 11 of crossbar 12 on second locking element part 8*b*. First and second locking element parts 8*a*, 8*b* are thus connected to one another, as a result of which the outer surface of the first locking element part rests against the outer surface of crossbar 12 in practically seamless alignment.

In a subsequent manufacturing step of locking element 7, optical code 9 is lasered onto locking element parts 8*a*, 8*b* thus connected to one another. In particular, optical code 9 is lasered onto locking element parts 8*a*, 8*b* in such a way that the extension of optical code 9 from the outer surface of crossbar 12 extends up to the outer surface of first locking element part 8*a*.

Optical code 9 may be a binary one-dimensional code or a two-dimensional code, for example, which for simplicity is referred to here as a barcode or as a data matrix code, respectively. Optical code 9 thus preferably forms a code that individualizes locking element 7, on the basis of which each individual locking element 7 may be distinguished, and re-recognized if necessary.

Figure 9:
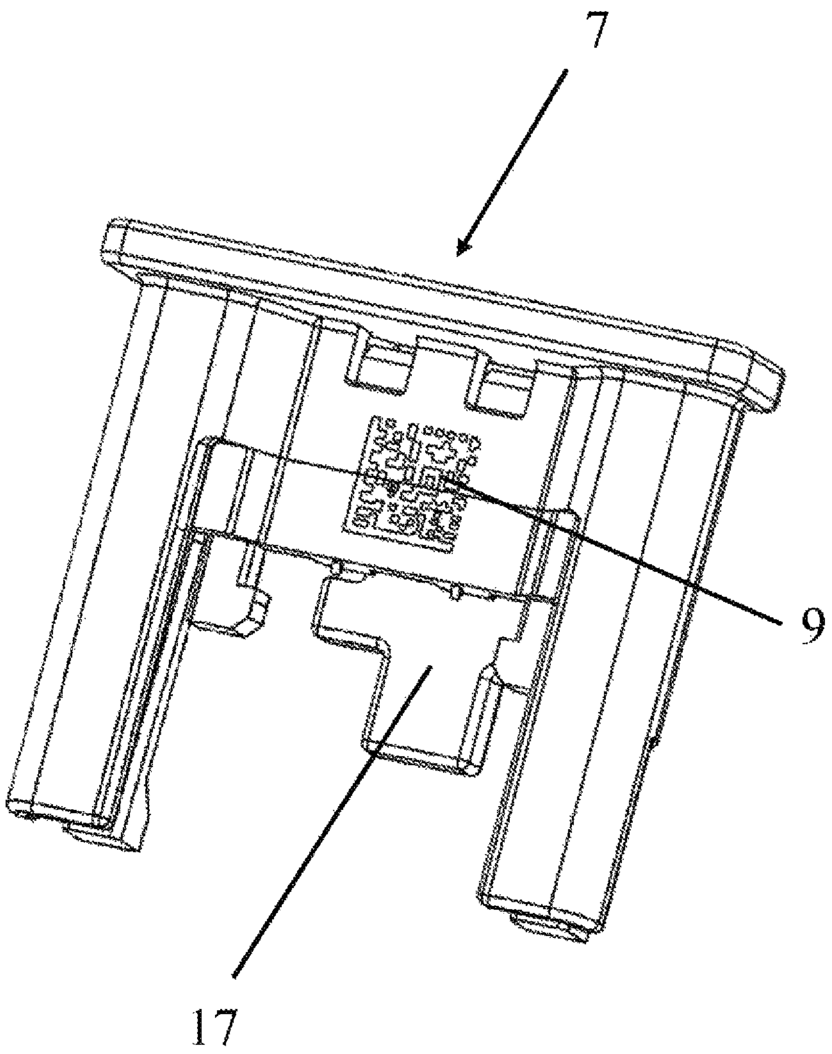
FIG. 9 illustrates the locking element with the optical code.
Figure 10:
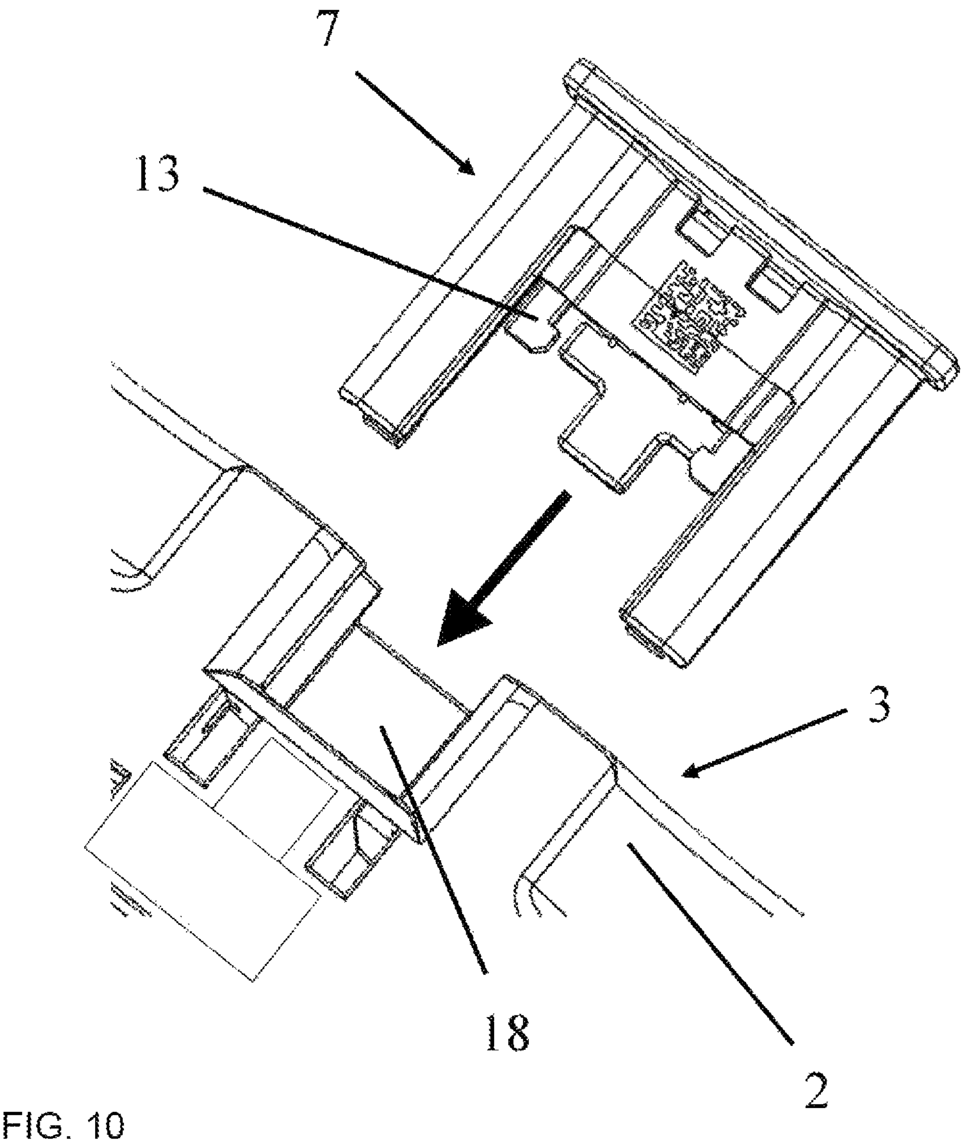
FIG. 10 illustrates the locking element upon attachment to the plug connector housing.
Figure 11:
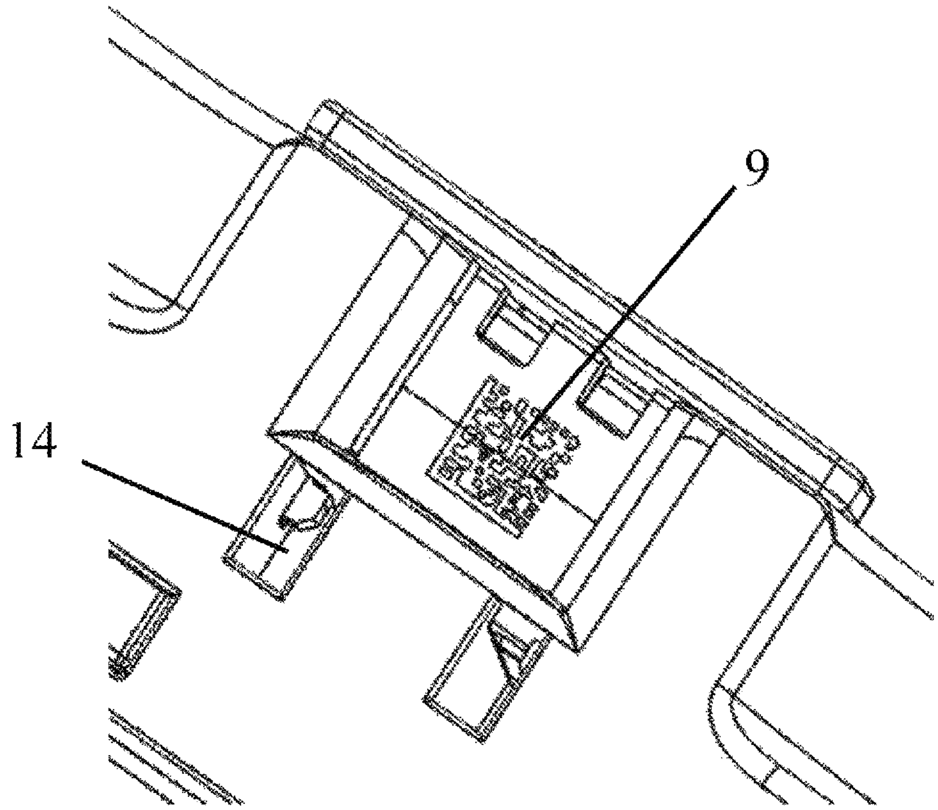
FIG. 11 illustrates the locking element attached to the plug connector housing and being in the locking position.
Figure 12:
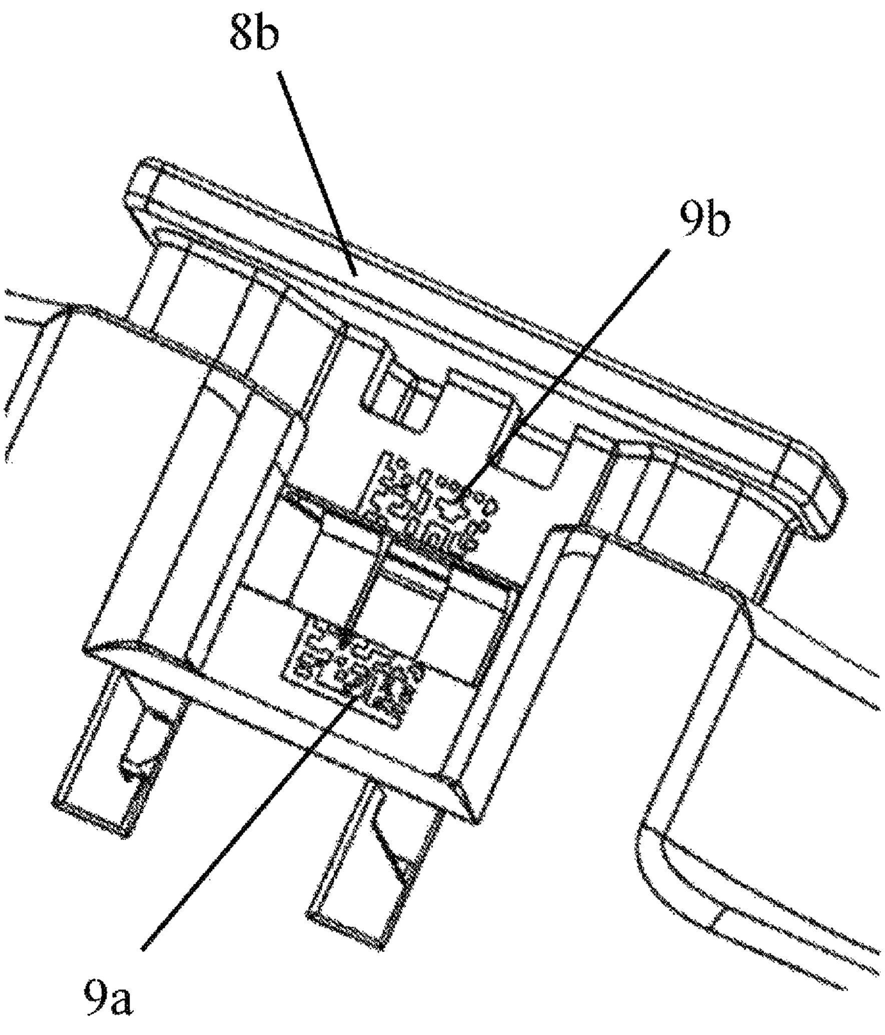
FIG. 12 illustrates the locking element attached to the plug connector housing and being in an unlocked position.

The finished locking element 7, shown in FIG. 9, is subsequently installed on connecting bar 2 of connecting lever 3 as shown in FIG. 10. Latching hooks 13 integrally formed on first locking element part 8*a* snap into detent recesses 14 at connecting lever 3. Optical code 9 is recognizable in a window gap 18 at connecting lever 3.

As latching hooks 13 are designed with a significantly greater material thickness than spring hooks 10, latching hooks 13 establish a strong, practically inseparable connection between locking element 7 and connecting lever 3. In contrast, the retaining force between spring hooks 10 and recesses 11 on second locking element part 8*b* is much lower, so that this locking connection may be separated with a force that is easily applied by hand.

During this operation, second locking element part 8*b* (i.e., the movable locking element part) is pushed against first locking element part 8*a* (i.e., the fixed locking element part) while the first locking element part remains fixed at connecting lever 3. This results in the position of locking element parts 8*a*, 8*b* relative to one another, shown in FIG. 12, in which the originally complete optical code 9 is now divided into two separate optical code sections 9*a*, 9*b*.

When connecting lever 3 is in its end position, shown in FIGS. 2, 3, 5, and 6, the two mutually displaceable locking element parts 8*a*, 8*b* may either lock or release connecting lever 3 at plug connector housing 1. This is brought about by a locking clip 17 that is integrally formed on second locking element part 8*b*, shown in FIG. 9.

Figure 13:
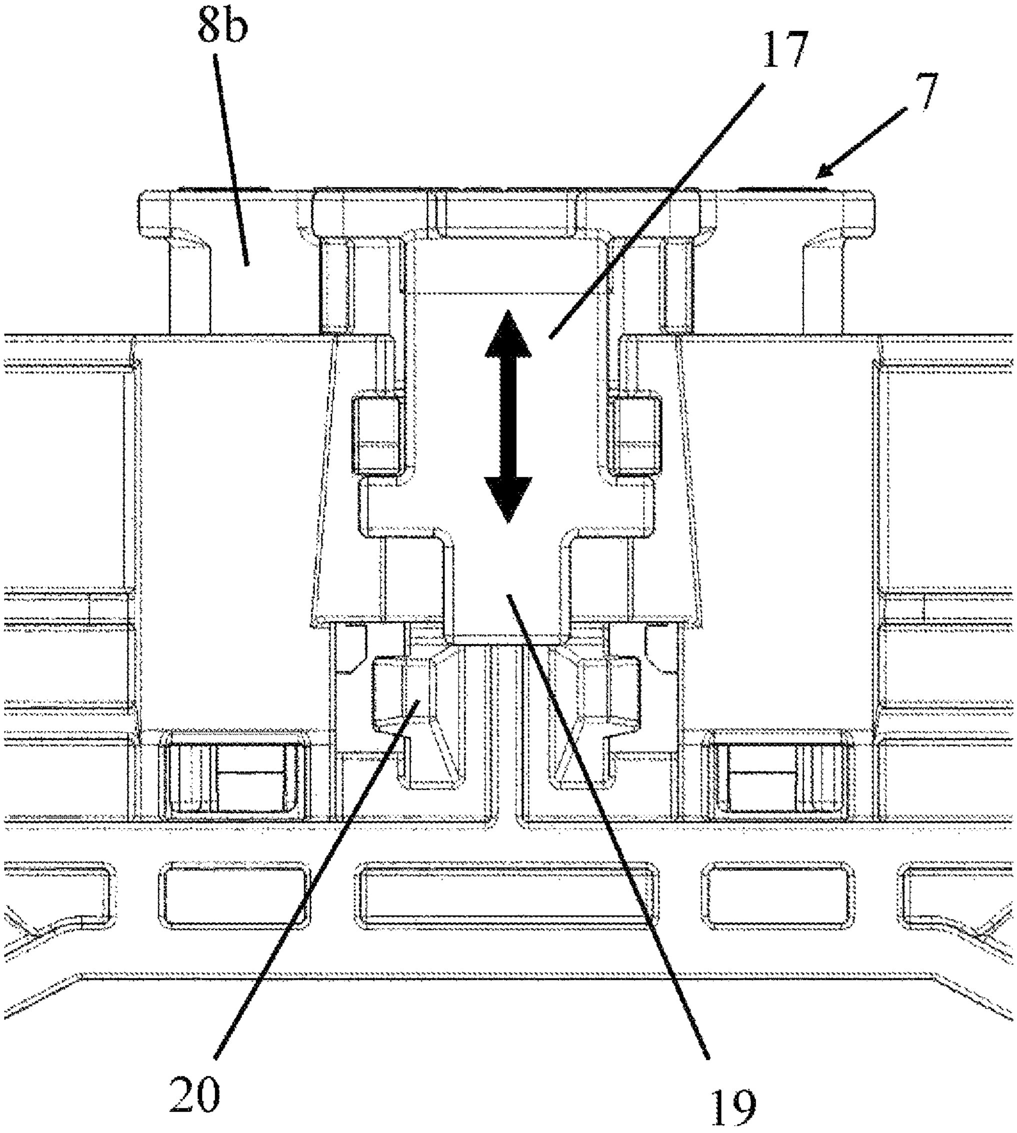
FIG. 13 illustrates a locking clip of the second locking element part being in a first position.
Figure 14:
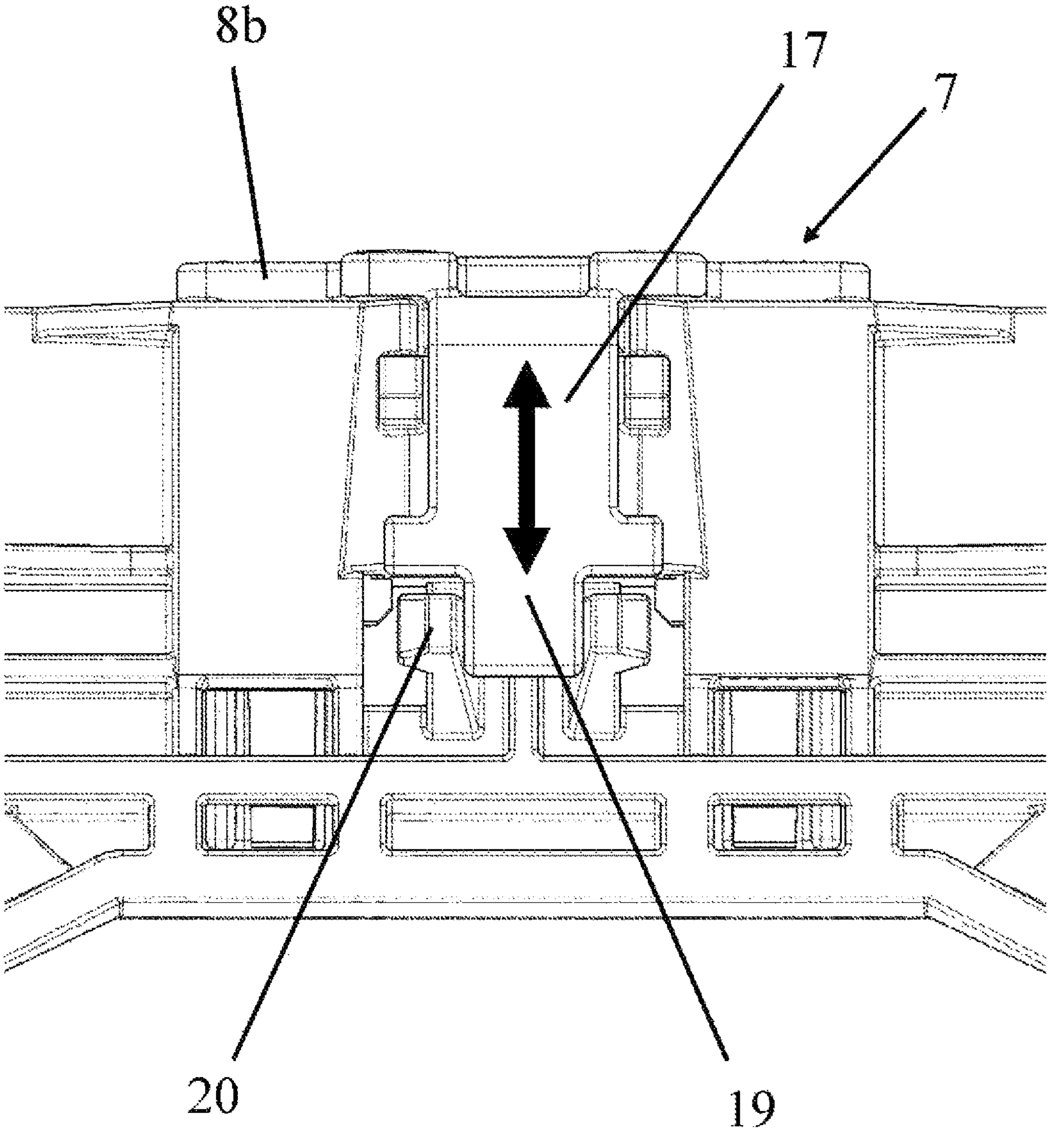
FIG. 14 illustrates the locking clip being in a second position.

As shown in FIGS. 13 and 14, in each case in a sectional view of plug connector housing 1, locking clip 17 moves together with second locking element part 8*b*. In the locking position of locking element 7, shown in FIG. 14, an outer section 19 of locking clip 17 is situated between two detent springs 20 integrally formed on plug connector housing 1. Locking clip 17 thus presses the two detent springs 20 apart.

Figure 15:
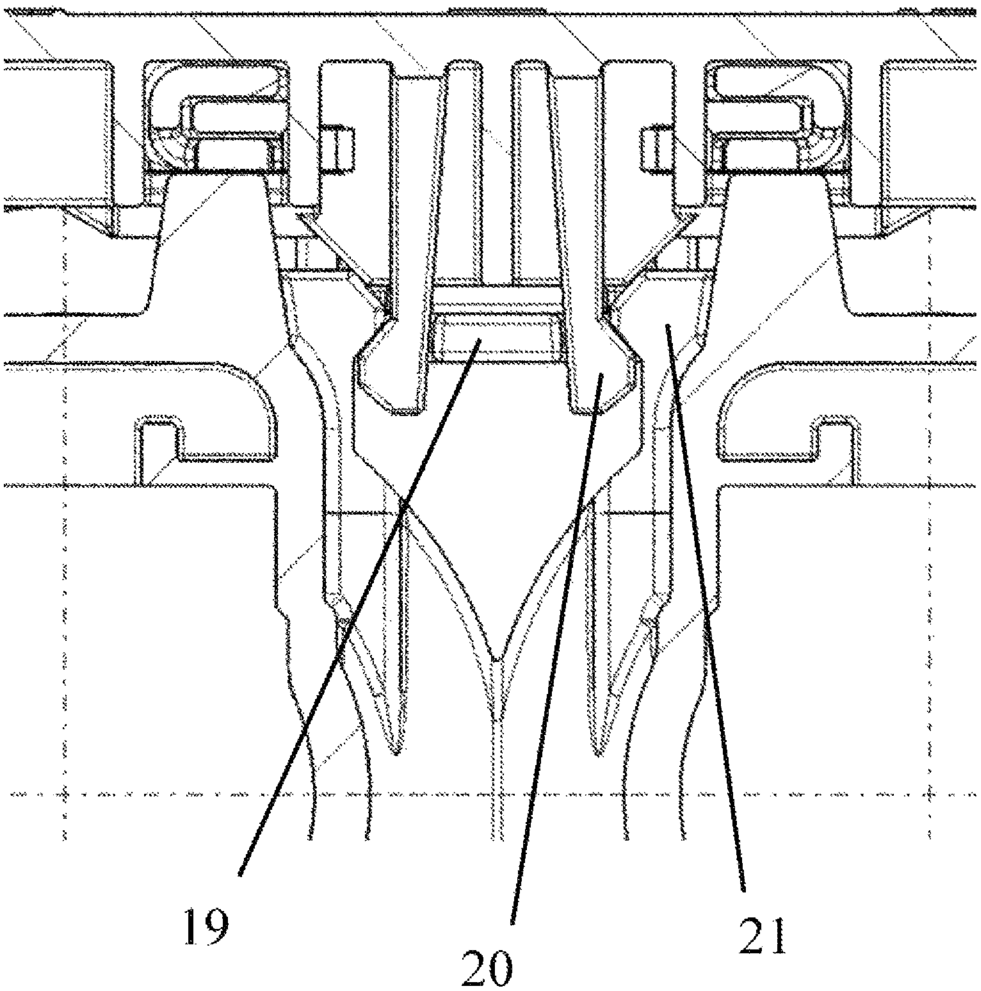
FIG. 15 illustrates a sectional view of the plug connector housing according to FIG. 6.

FIG. 15 illustrates the installed state depicted in FIG. 14, in a representation that is rotated by 90°, resulting as section A-A of the view of plug connector housing 1 according to FIG. 6.

It is apparent from FIG. 15 that the two detent springs 20, pressed apart by the outer section 19 of locking clip 17, lock two housing sections 21 that are part of plug connector housing 1. The rotatability of connecting lever 3 is thus cancelled, so that the connecting lever remains in its folded-in position (i.e., its end position) at plug connector housing 1 as long as locking element 7 is in the locking position. Locking element 7 thus fulfills its function as a position securing lock or CPA lock.

Figure 16:
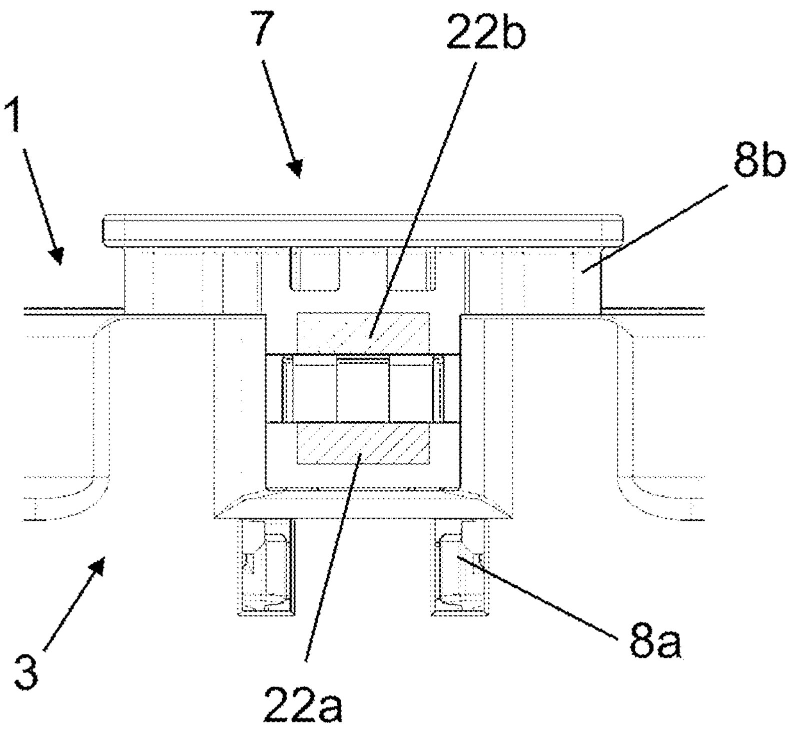
FIG. 16 illustrates a first alternative embodiment of the electrical plug connector with the locking element being unlocked.
Figure 17:
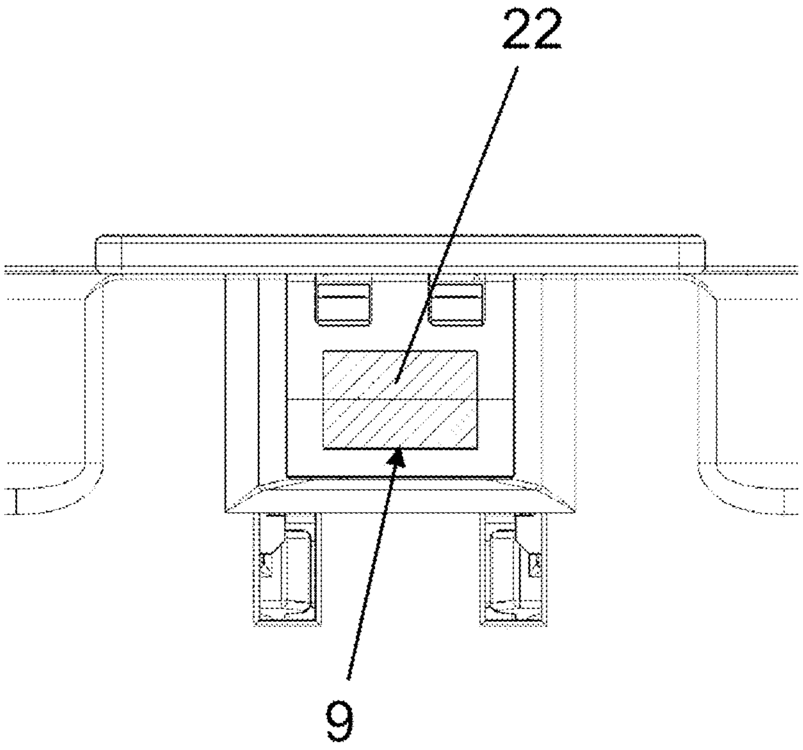
FIG. 17 illustrates the first alternative embodiment of the electrical plug connector with the locking element being locked.

FIGS. 16 and 17 show a further embodiment of the electrical plug connector in which optical code 9 does not have to be a barcode or data matrix code, but, rather, may also be formed by a simple symbol 22. Symbol 22 may in principle be implemented using any distinguishable representation. Symbol 22 may particularly advantageously be designed as a simple geometric figure, referred to below as a "geometric symbol."

Geometric symbol 22 here is made up, by way of example, of a rectangular surface having fixed dimensions and/or proportions. The rectangular surface is divided into two symbol sections 22*a*, 22*b*. Symbol sections 22*a*, 22*b* are situated on first and second locking element parts 8*a*, 8*b*, respectively. Symbol sections 22*a*, 22*b* are joined when locking element parts 8*a*, 8*b* are brought together in the locking position to thereby form a complete geometric symbol 22 in the form of a completed rectangular surface.

Alternatively, geometric symbol 22 may also be formed by a circular surface, a triangular surface, or some other geometric shape that is divided into sections, and that is completed by joining locking element parts 8*a*, 8*b* together in the locking position.

Such an embodiment is particularly advantageous, since the recognition of a geometric symbol 22 made up of symbol sections 22*a*, 22*b* is much less tolerance-sensitive than the correct recognition of a data matrix or barcode joined together from optical code sections 9*a*, 9*b*.

Figure 18:
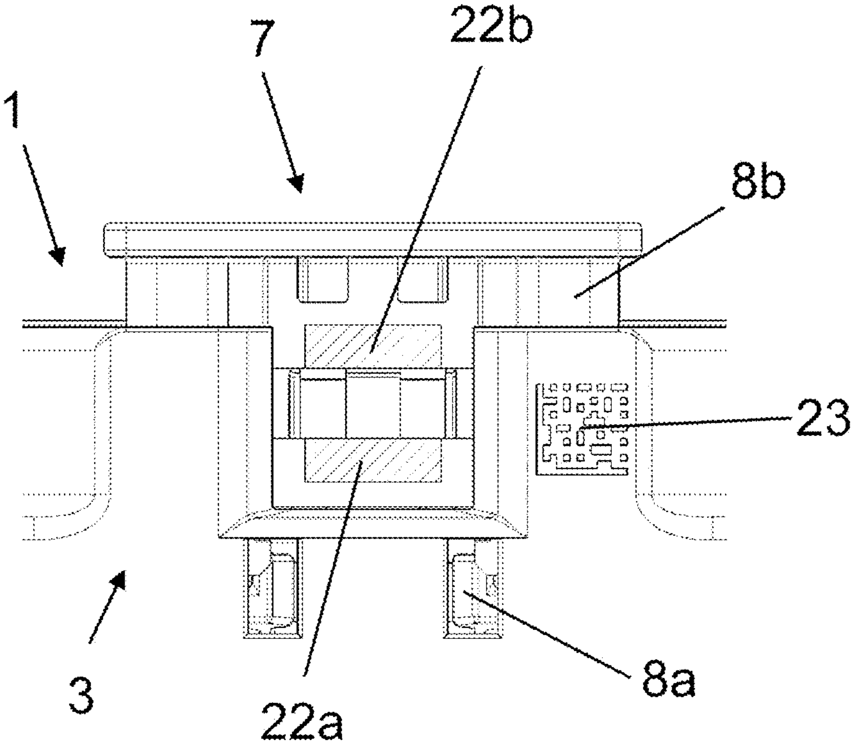
FIG. 18 illustrates a second alternative embodiment of the electrical plug connector with the locking element being unlocked and an additional data matrix code provided either on the plug connector housing or the connecting lever.
Figure 19:
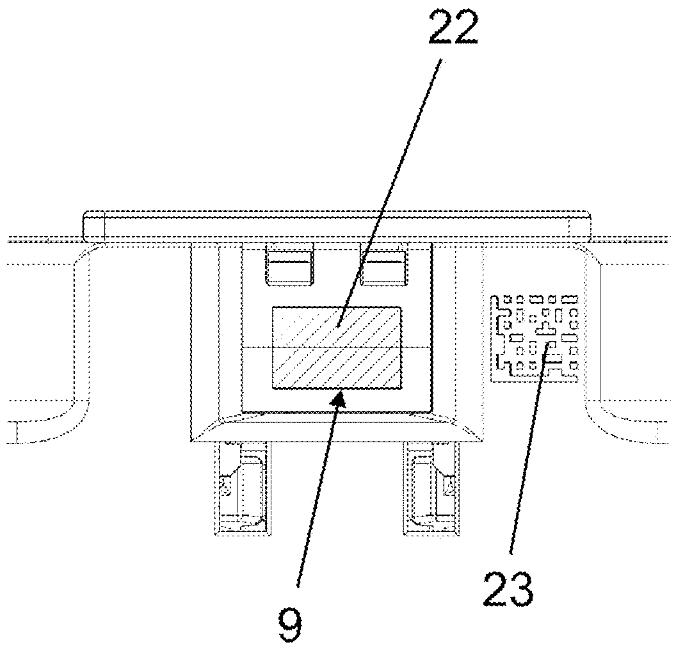
FIG. 19 illustrates the second alternative embodiment of the electrical plug connector with the locking element being locked and the additional data matrix code provided either on the plug connector housing or the connecting lever.

As indicated in FIGS. 18 and 19, in addition, an undivided data matrix or barcode 23 may be situated on a portion of plug connector housing 1 or connecting lever 3 to allow an individualized detection of the electrical plug connector.

However, this data matrix or barcode 23 is not read and/or accepted as valid by a reading device until the reading device has previously recognized a completely joined geometric symbol 22.

Figure 20:
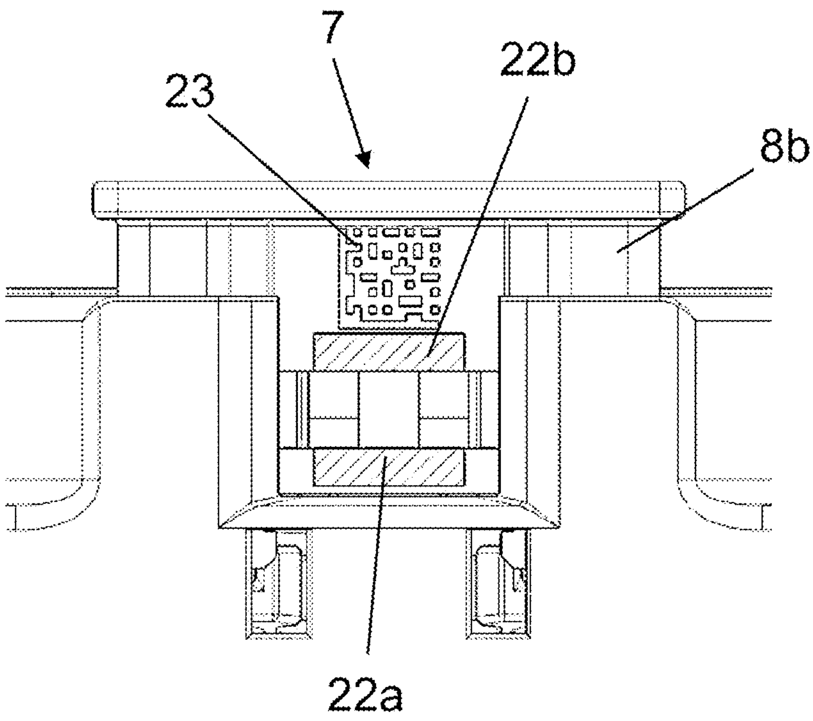
FIG. 20 illustrates a third alternative embodiment of the electrical plug connector with the locking element being unlocked and an additional data matrix code provided on the locking element.
Figure 21:
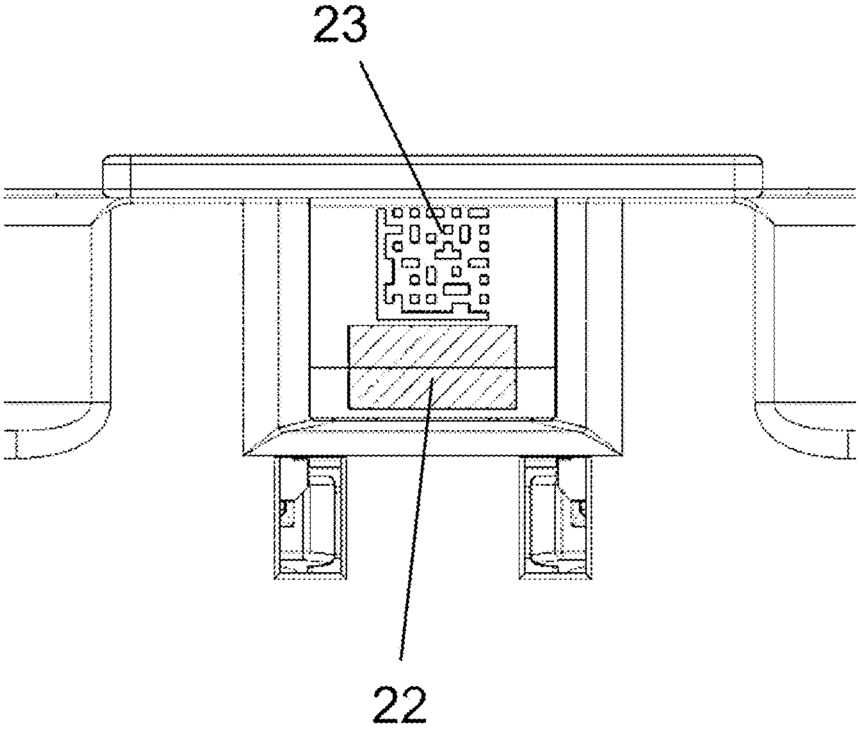
FIG. 21 illustrates the third alternative embodiment of the electrical plug connector with the locking element being locked and the additional data matrix code provided on the locking element.

A further embodiment of the electrical plug connector is illustrated in FIGS. 20 and 21. An additional data matrix code 23 is situated here on movable locking element part 8*b*. The data matrix code 23 as well is not read and/or accepted as valid by a reading device until the reading device has previously recognized a completely joined geometric symbol 22 made up of two symbol sections 22*a*, 22*b*.

LIST OF REFERENCE NUMERALS

1 plug connector housing
2 connecting bar
3 connecting lever
4 connecting lever parts
5 guide paths
6 pivot pin
7 locking element
8*a* locking element first part
8*b* locking element second part
9 optical code
9*a*, 9*b* optical code sections
10 spring hook
11 recesses
12 crossbar
13 latching hook
14 detent recess
(13, 14) detent means
15 guides
16 guide grooves
17 locking clip
18 window gap
19 outer section
20 detent springs
21 housing sections
22 symbol
22*a*, 22*b* symbol sections
23 (undivided) data matrix or barcode While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An electrical plug connector comprising:
a plug connector housing;
a connecting lever rotatable with respect to the plug connector housing between an initial position and an end position;
the connecting lever including a locking element, the locking element including a first part fixed to the connecting lever by detent means and a second part displaceable relative to the first part, wherein the locking element mechanically locks the connecting lever in the end position to the plug connector housing when the connecting lever is in the end position and the second part is displaced relative to the first part to a locking position; and
the first part carrying a first section of an optical code and the second part carrying a second section of the optical code, the optical code being completed when the second part is displaced relative to the first part to the locking position whereby the optical code is detectable by an optical reading device.

2. The electrical plug connector according to claim 1 wherein:
the optical code is a barcode.

3. The electrical plug connector according to claim 1 wherein:
the optical code is a data matrix code.

4. The electrical plug connector according to claim 1 wherein:
the optical code is a symbol.

5. The electrical plug connector according to claim 4 wherein:
the symbol is a geometric figure or a character.

6. The electrical plug connector according to claim 1 wherein:
an additional barcode or a data matrix code is situated either on the plug connector housing, the connecting lever, the first part of the locking element, or the second part of the locking element.

7. The electrical plug connector according to claim 1 wherein:

the first and second sections of the optical code are respectively lasered onto the first and second parts of the locking element.

8. The electrical plug connector according to claim 1 wherein:

the first and second sections of the optical code are respectively printed or applied as an adhesive sticker on the first and second parts of the locking element.

9. The electrical plug connector according to claim 1 wherein:

the connecting lever further includes a first lever portion and a second lever portion, the first and second lever portions being situated at the plug connector housing and being rotatable together with the connecting lever with respect to the plug connector housing between the initial position and the end position, the first and second lever portions each having a guide path into which guide pins of a mating plug connector housing are respectively insertable, whereby the mating plug connector housing is rotatable together with the connecting lever to be attached to the plug connector housing.

10. The electrical plug connector according to claim 1 wherein:

the detent means includes a hook on the first part of the locking element and a recess at the connecting lever, the first part being fixed to the connecting lever by the hook being snapped into the recess.

11. The electrical plug connector according to claim 1 wherein:

the detent means includes a pair of hooks on the first part of the locking element and a pair of recesses at the connecting lever.

12. An electrical plug connector comprising:

a plug connector housing;

a connecting lever rotatable with respect to the plug connector housing between an initial position and an end position;

the connecting lever having a locking element, when the connecting lever is in the end position the locking element being displaceable relative to the plug connector housing to a locking position in which the locking element mechanically locks the connecting lever in the end position to the plug connector housing;

the locking element carrying an optical code that is complete when the locking element is in the locking position whereby the optical code is detectable and decodable by an optical reading device;

the locking element being made up of two parts which are displaceable relative to one another with one of the parts being fixed to the connecting lever by detent means and which each carry respective first and second sections of the optical code; and the optical code being complete when the locking element is in the locking position by the two parts being in a corresponding displacement position relative to one another with the first and second sections of the optical code correspondingly being arranged to complete the optical code.

13. The electrical plug connector according to claim 12 wherein:

the connecting lever further includes a first lever portion and a second lever portion, the first and second lever portions being situated at the plug connector housing and being rotatable together with the connecting lever with respect to the plug connector housing between the initial position and the end position, the first and second lever portions each having a guide path into which guide pins of a mating plug connector housing are respectively insertable, whereby the mating plug connector housing is rotatable together with the connecting lever to be attached to the plug connector housing.

14. The electrical plug connector according to claim 12 wherein:

the detent means includes a hook on the one of the parts of the locking element and a recess at the connecting lever, the one of the parts being fixed to the connecting lever by the hook being snapped into the recess.

15. The electrical plug connector according to claim 12 wherein:

the detent means includes a pair of hooks on the one of the parts of the locking element and a pair of recesses at the connecting lever.

* * * * *